United States Patent [19]

Tanksalvala et al.

[11] Patent Number: 5,526,500
[45] Date of Patent: Jun. 11, 1996

[54] SYSTEM FOR OPERAND BYPASSING TO ALLOW A ONE AND ONE-HALF CYCLE CACHE MEMORY ACCESS TIME FOR SEQUENTIAL LOAD AND BRANCH INSTRUCTIONS

[75] Inventors: Darius F. Tanksalvala, Denver; Eric R. DeLano, Fort Collins; Patrick Knebel, Fort Collins; Thomas R. Hotchkiss, Fort Collins; R. Craig Simpson, Fort Collins, all of Colo.

[73] Assignee: Hewlett-Packard Company, Palo Alto, Calif.

[21] Appl. No.: 387,960

[22] Filed: Feb. 10, 1995

Related U.S. Application Data

[63] Continuation of Ser. No. 26,233, Mar. 2, 1993, abandoned, which is a continuation of Ser. No. 479,785, Feb. 13, 1990, abandoned.

[51] Int. Cl.$^6$ .............................. G06F 9/32; G06F 9/312
[52] U.S. Cl. .................................................................. 395/375
[58] Field of Search .................................... 395/375, 425, 395/450, 485

[56] References Cited

U.S. PATENT DOCUMENTS

| | | | |
|---|---|---|---|
| 3,949,379 | 4/1976 | Ball | 395/775 |
| 4,594,655 | 6/1986 | Hao et al. | 395/775 |
| 4,750,112 | 6/1988 | Jones et al. | 395/375 |
| 4,755,966 | 7/1988 | Lee et al. | 395/375 |
| 4,760,519 | 7/1988 | Papworth et al. | 395/375 |
| 4,777,587 | 10/1988 | Case et al. | 395/375 |
| 4,802,113 | 1/1989 | Onishi et al. | 395/375 |
| 4,851,993 | 7/1989 | Chen et al. | 395/250 |
| 4,888,689 | 12/1989 | Taylor et al. | 395/425 |
| 4,958,276 | 9/1990 | Kiuchi . | |
| 4,965,764 | 10/1990 | Aono | 395/425 |
| 4,967,351 | 10/1990 | Zmyslowski et al. | 395/800 |
| 4,991,080 | 2/1991 | Emma et al. | 395/375 |
| 4,996,661 | 2/1991 | Cox et al. | 364/748 |
| 5,148,529 | 9/1992 | Ueda et al. | 395/375 |

FOREIGN PATENT DOCUMENTS

| | | |
|---|---|---|
| A-0144249 | 12/1984 | European Pat. Off. . |
| A-0155211 | 2/1985 | European Pat. Off. . |

OTHER PUBLICATIONS

Emil W. Brown, et al, "Implementing Sparc In ECL," IEEE Computer Society, vol. 10, No. 1, Feb. 1990, pp. 10–22.
"Effecting A One Cycle Cache Access In A Pipeline Having Split D/A Using DLO Bandwidth", *IBM Technical Disclosure Bulletin*, vol. 31, No. 8, pp. 24–25, (Jan. 1989).
Nogami et al., "A 9-NS Hit-Delay 32-KBYTE Cache Macro For High-Speed RISC", *IEEE Journal Of Solid-State Circuits*, vol. 25, No. 1, pp. 100–106 (Feb. 1987).
Tone et al., "Development Concepts And Hardware Architecture Of The Facom M-780 Model Group", *Fijitsu-Scientific And Technical Journal*, vol. 23, No. 4, pp. 201–215 (Dec. 1987).
European Search Report issued in connection with EPO Application No. 90124882 and dated Dec. 22, 1992.

*Primary Examiner*—Richard L. Ellis

[57] ABSTRACT

Pipeline structure that is arranged to allow 1.5 cycle access time for both data and instruction cache without imposing additional instruction step delays than that imposed by data and instruction cache that have 1 cycle access time. Half cycle pulses are produced to allow execution of various instructions in 0.5 cycles. A bypass signal is generated to allow data from a current load instruction to be available for a second subsequent instruction even though the access time for data cache is 1.5 cycles. Additionally, a branch address is available for a third subsequent instruction even though instruction cache access time is 1.5 cycles. The present invention shows the initiation of an instruction step for each cycle and 1.5 cycle access time for cache memory. The present invention can also be implemented by implementing an instruction every 2 cycles and providing 3 cycle access time for cache memory.

29 Claims, 7 Drawing Sheets

FIG 7

| OPCODE | b FIELD | x FIELD | C FIELD | w1 FIELD | N | W |
|---|---|---|---|---|---|---|
| 6 BITS | 5 BITS | 5 BITS | 3 BITS | 11 BITS | 1 | 1 |

→ BRANCH

FIG 8

| OPCODE | b FIELD | t FIELD | SPACE | IM 14 |
|---|---|---|---|---|
| 6 BITS | 5 BITS | 5 BITS | 2 BITS | 14 BITS |

→ LOAD

SYSTEM FOR OPERAND BYPASSING TO ALLOW A ONE AND ONE-HALF CYCLE CACHE MEMORY ACCESS TIME FOR SEQUENTIAL LOAD AND BRANCH INSTRUCTIONS

CROSS REFERENCE TO RELATED APPLICATIONS

This is a continuation of application Ser. No. 08/026,233 filed on Mar. 2, 1993, now abandoned, which is a continuation of application Ser. No. 07/479,785 filed on Feb. 13, 1990, now abandoned.

BACKGROUND OF THE INVENTION

A. Field of Invention

The present invention pertains generally to computer systems and more particularly to the manner of executing successive instructions in a computer system.

B. Description of the Background

Digital computer systems operate by executing a series of successive instructions that control the functions of the computer system. Typically, a new instruction step will be initiated for each cycle that is initiated by a processor of the computer system, so that a successive number of sequential instructions are being executed by the processor simultaneously. This process of executing a series of successive instruction steps simultaneously is known as a "pipeline." For any given set of successive instruction steps, the instruction that is currently being executed is referred to as the "current instruction step" and each successive subsequent instruction is indicated by its number. For example, the next instruction that is executed after the current instruction is referred to as the "first subsequent instruction step." If that instruction step is a "load instruction" that instruction step is referred to as the "first subsequent load instruction step." Similarly, if that instruction is an "add and branch if true instruction" it may be referred to as a "first subsequent branch instruction step." The next instruction step after the first subsequent instruction step is referred to as the "second subsequent instruction step," and so on. If, for any reason, an instruction step must be skipped in the series of successive instruction steps, the pipeline is said to have imposed upon it a "penalty of a one instruction step delay." This can occur, for example, when a load instruction needs data from a previous load instruction which has not yet finished retrieving the necessary data from a data cache. For example, instruction step delays may occur when the "operand address," i.e., the address from which data is to be retrieved from a general register, for a subsequent instruction, is the same as the "target address," i.e., the address to which data is to be stored or written, for a previous instruction. If the previous instruction has not yet stored the data in the general registers at the target address, and the target address is the same as the operand address of a subsequent instruction, then the subsequent instruction cannot be executed and a delay penalty will be imposed.

A similar situation occurs during a "branch instruction," i.e. an instruction that directs the processor to branch off to a new location in the sequence of successive instructions that would otherwise be followed by the processor. During the execution of a branch instruction, the branch instruction generates a new address for retrieving the new instruction. The processor requires a certain period of time to retrieve the branch instruction, decode it and determine the new address of the branch instruction. Since these functions take numerous cycles to accomplish, a number of instruction step delays may be imposed on the pipeline. Typically, the branch instruction is placed in the pipeline so that the first subsequent instruction after the branch instruction is an instruction that would normally be executed in the series of successive instruction steps. A pipeline designed in this manner is referred to as a "one state delay branch architecture." Hence, if the branch instruction address is not ready until the third subsequent instruction step, a penalty of only a one instruction step delay is imposed in a one state delay branch architecture.

In designing a microprocessor chip, it is advantageous to have the chip operate as fast as possible, by executing instructions and processing information in the shortest possible time. In achieving this goal, it is desirable to minimize the penalties for instruction step delays. Otherwise, the time gained in decreasing cycle time may be lost in instruction step delays. One method that has been used to significantly decrease the access time for retrieving an instruction, or data, has been to use instruction caches and data caches which comprise high speed memory that are connected directly between the microprocessor chip and slower memory such as dynamic random access memory (DRAM). These cache memories can comprise high speed flip-flops that are expensive, and occupy a relatively large amount of space in the system for the amount of data stored. Despite these limitations, cache memory does have a relatively fast response time which allows data or instructions to be fetched in a relatively rapid manner in comparison to DRAM, i.e., typically on the order of 15 nanoseconds to 30 nanoseconds or more access time. Access time, in this regard, may include the full cycle time from issuing an address until an instruction is received back by a processor and decoded.

Although cache memory in the form of instruction cache and data cache, is significantly faster than DRAM, it does limit the speed at which a microprocessor can operate. Conventional microprocessor architectures are designed for an access time for instruction cache and data cache of one cycle. By providing a one cycle response time, a penalty of only one instruction step delay is imposed for subsequent load instructions, i.e., the data is available for a second subsequent load instruction. Similarly, a penalty of only one instruction step delay is imposed for branch instructions in a one-state delay branch architecture, i.e., the branch address is available for the third subsequent instruction step. The problem with allowing only a one cycle response time, to fetch instructions from the instruction cache and to fetch data from the data cache, is that the cycle period of the processor must be sufficiently long to accommodate the response time of the instruction cache and the data cache. It is clear that many other steps can be executed in the microprocessor in a much shorter period than the period required by the response time of the instruction cache and data cache memories. Hence, the entire system must be slowed down and operate at slower speeds. With currently available instruction cache and data cache, typical microprocessors operate, at the present time, in the range of 15 to 20 megahertz. The limit of operation with currently available memory caches using current pipeline techniques may be on the order of 40 megahertz.

The one method considered by the inventors of the present invention to overcome these limitations, but not known to be prior art, was to allow two cycle periods for the instruction cache and data cache access time, while operating the other instructions on a one cycle time period. While this allows the microprocessor to operate at a much faster rate, i.e., double the rate at which it could operate if the cache memories had an access time of only one cycle, penalties of greater than one instruction step delay were imposed in the pipeline, which did not net an overall decrease in the response time of the microprocessor system. For example, in the process of executing load instructions, a penalty of a two instruction step delay was imposed when the data cache access time was set at two cycles. Similarly, in branch instructions, a penalty of a two instruction step delay was imposed in a one state delay branch architecture when the instruction cache access time was set at two cycles.

Hence, prior art microprocessors have been limited by the response time of the memory cache, and the allowance of a two cycle response time for memory cache does not solve these problems since additional instruction delay penalties would be imposed on the pipeline.

SUMMARY OF THE INVENTION

The present invention overcomes the disadvantages and limitations of the prior art by providing a unique method and device of executing instructions in an instruction pipeline that allows more than one cycle access time for instruction cache and memory cache while imposing a delay of only one instruction step in the pipeline for both load and branch instructions. The present invention may therefore include a method of executing a series of instructions in a computer system such that a separate instruction step is initiated for at least every cycle comprising the steps of; accessing instruction cache in the computer system to fetch an instruction in less than two cycles and more than one cycle to allow an access time of more than one cycle for the instruction cache, accessing data cache in the computer system to fetch data in less than two cycles and more than one cycle to allow an access time of more than one cycle for the data cache, directing data from the data cache to an arithmetic logic unit whenever the data is required by a second subsequent instruction step so that a penalty of only one instruction step delay is imposed even though the access time of the instruction cache and the data cache is more than one cycle, and, executing a third subsequent instruction step as a branch instruction designated by a current instruction step whenever a specified condition in the current instruction step is true so that a penalty of only one instruction step delay is imposed in a one state delay branch architecture even though the access time of the instruction cache and the data cache is more than one cycle.

The present invention may also comprise a device for executing load instructions in an instruction pipeline that allows more than a one cycle access time for data cache while imposing a delay of only one instruction step for load instructions comprising; clock means for generating cycle clock pulses that define a cycle period and phase shifted clock pulses that are phase shifted from the cycle clock pulses by a predetermined phase shift period, control means for generating a bypass signal whenever a target address of a current load instruction step is the same as a operand address for a second subsequent load instruction step, data cache means having an access time substantially equal to the cycle period plus the predetermined phase shift period for generating data cache data, means for directing the data cache data from a current load instruction step to an arithmetic logic unit in response to the bypass signal so that the data cache data from the current load instruction can be combined with an immediate value of a second subsequent load instruction step resulting in a delay of only one instruction step even though the data cache means has an access time substantially equal to the cycle period plus the predetermined phase shift period.

The present invention may also comprise a device for executing branch instructions in an instruction pipeline that allows more than one cycle access time for instruction cache while imposing a delay of only one instruction step in a one state delay branch architecture comprising; clock means for generating cycle clock pulses that define a predetermined cycle period and phase shifted clock pulses that are phase shifted from the cycle clock pulse by a predetermined phase shift period, comparator means for comparing a condition value of a current branch instruction with a general register sum to produce a comparator control signal, means for generating a branch address whenever the condition value is the same as the general register sum, and, instruction cache means for generating a branch instruction in response to the branch address during an access time that is substantially equal to the predetermined cycle period plus the predetermined phase shift period so that the branch instruction can be utilized by a third subsequent instruction, resulting in a delay of only one instruction step in a one state delay branch architecture device.

The advantages of the present system are that the predetermined phase shift period can be set at approximately half a cycle so that the instruction cache and data cache are given an extra half cycle response time. Since a clock pulse is produced every half cycle, other operations within the microprocessor can be executed during half cycle periods which allows the computer system to operate at a very high speed. In fact, this may triple the operational speed of executing some instructions over the limits of conventional microprocessors that allow a one cycle response time for the memory cache. In essence, both the instruction cache and data cache are given the equivalent of three half-cycle response periods without imposing a penalty of more than a one instruction step delay, which is no greater than prior art systems.

BRIEF DESCRIPTION OF THE DRAWINGS

FIG. 7 is a schematic diagram illustrating the data fields of a branch instruction.

FIG. 8 is a schematic diagram illustrating the data fields of a load instruction.

DETAILED DESCRIPTION OF THE PRESENT INVENTION

Figure 1:
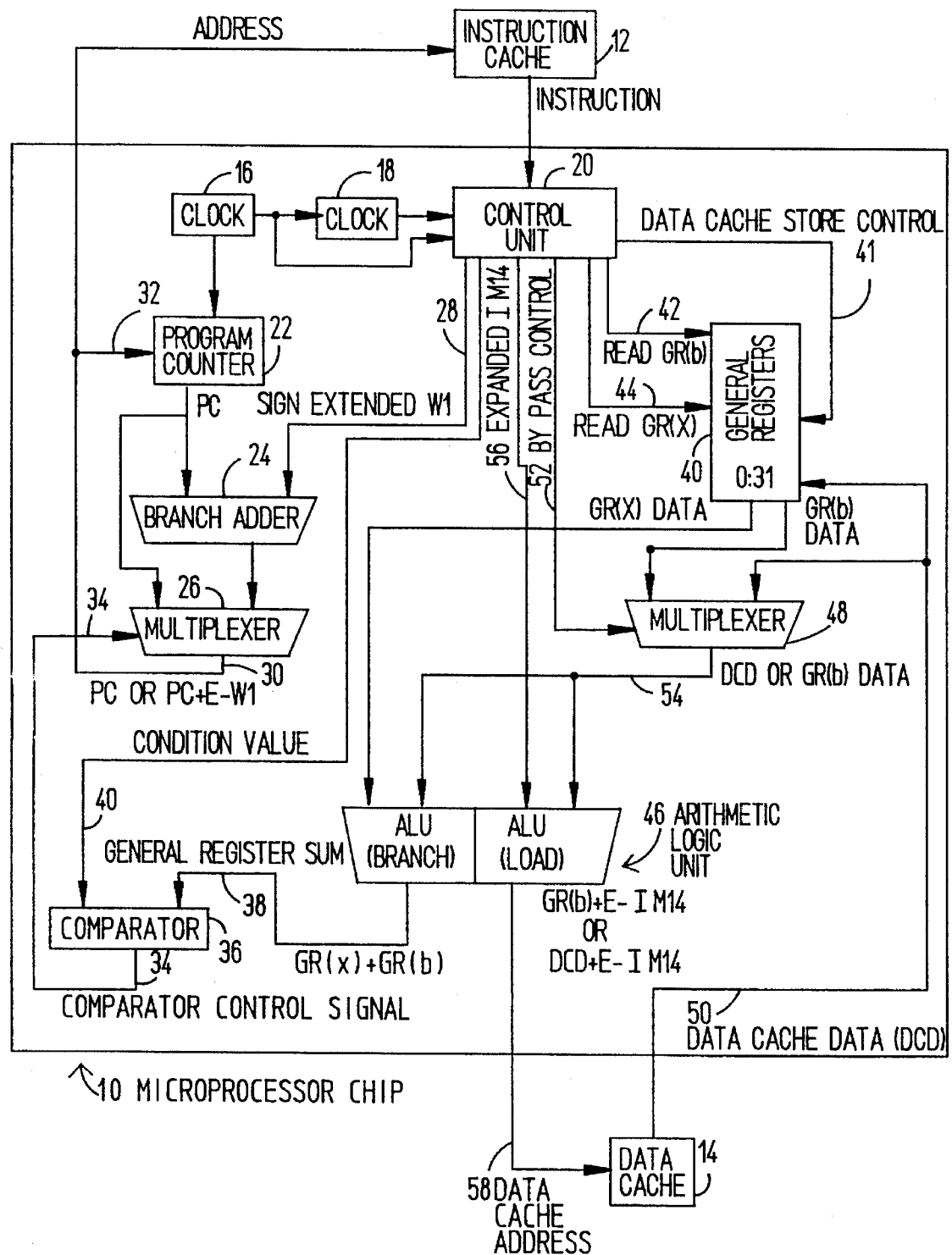
FIG. 1 is a schematic block diagram of the microprocessor apparatus and memory caches of the present invention.

FIG. 1 is a schematic block diagram of the device of the present invention illustrating a microprocessor chip 10 having an instruction cache 12 and a data cache 14 attached to the microprocessor 10. Instruction cache 12 and data cache 14 may have additional connections to DRAM which are not shown, as well as control lines for reading and writing data from DRAM memory (not shown). Additionally, microprocessor chip 10 does not illustrate all of the commonly known components of a microprocessor chip, but rather, illustrates the primary components and the interconnection of these components that relate to the present invention.

In accordance with the present invention, clock circuit 16 generates clock signals that are referred to as "cycle clock pulses." These pulses indicate the beginning of each cycle in the pipeline. Similarly, clock 18 has the same period as clock 16, but is phase shifted by a predetermined phase shift period. Clock pulses can be generated in accordance with a clock circuit such as disclosed in U.S. patent application Ser. No. 479,562 filed Feb. 13, 1990 by Robert H. Miller entitled "High Speed Low Skew Clock Circuit" which is specifically incorporated herein by reference. In accordance with the preferred embodiment of the invention, clock 18 is phase shifted by a half cycle so that clock 16 and clock 18 produce clock pulses each half cycle. These clock pulses are transmitted to control unit 20, as well as many of the other components illustrated in FIG. 1. Specifically, the cycle clock pulses produced by clock 16 at the beginning of each cycle are transmitted to program counter 22 which is incremented by one for each cycle clock pulse. The program counter count, which is known as a "PC value," is transmitted to branch adder 24 and multiplexer 26. Branch adder 24 adds the PC value to a value specified by a current branch instruction, which is a value W1 that has been sign extended (E-W1), as more fully described in the description of FIGS. 4 and 7. The sign extended W1 value is transmitted from control unit 20 to branch adder 24 on line 28. Multiplexer 26 selects either the PC value transmitted directly from program counter 22, or the PC value plus the sign extended W1 (E-W1) value from branch adder 24, and produces one of these at its output on line 30. These values are transmitted as an address to instruction cache 12 and as a new load value to load, or reset, the program counter 22 via line 32.

Multiplexer 26 selects one of these values in accordance with a comparator control signal 34 produced by a comparator 36. Comparator 36 compares a general register sum produced on input line 38 with condition data 43 transmitted from control unit 20. The general register sum is equal to the general register data specified by the "x" field of a branch instruction plus the general register data specified by the "b" field of a branch instruction. The GR(x) data is transmitted directly from general register 40 in response to read signal 44, and the GR(b) data is read indirectly through multiplexer 48 in response to read signal 42 and bypass control signal 52 produced by control unit 20, and are added in arithmetic logic unit 46, to produce the general register sum. The general register data specified by the "b" field of a load instruction is transmitted to multiplexer 48 in response to a read signal transmitted by line 42 to read the general register specified by the "b" field of a load instruction.

Figure 3:
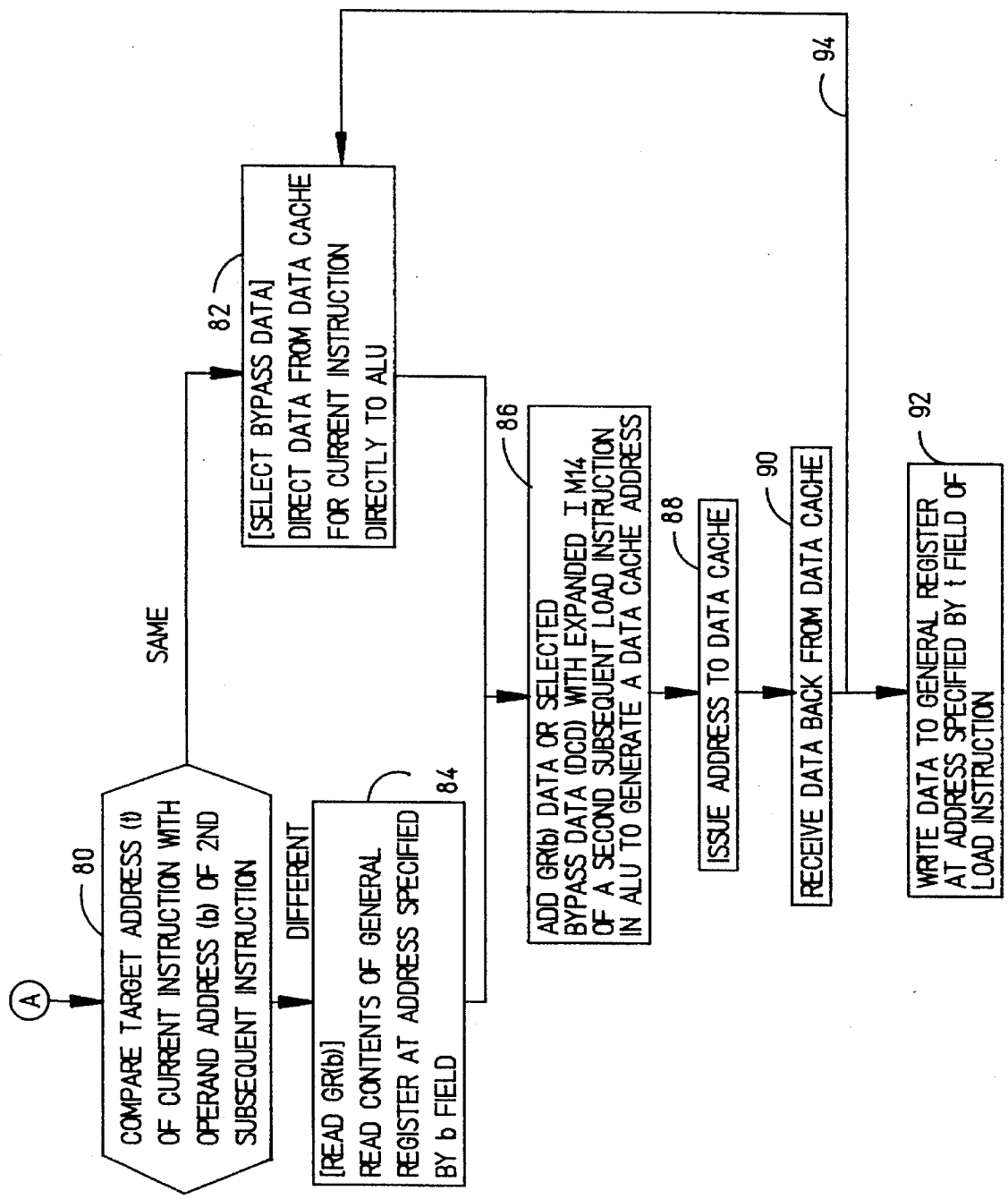
FIG. 3 is a flow diagram of the operation of the device of FIG. 1 during a load instruction step.

Data cache data produced at the output of 50 of data cache 14 is also transmitted to multiplexer 48. Multiplexer 48 selects either the data from the general register specified by the "b" field of a load instruction [GR(b)data] or the data cache data (DCD), in accordance with a bypass control signal 52 produced by control unit 20. Bypass control 52, as explained more fully in the description of FIG. 3, is generated whenever the data cache data is to be directly channelled to arithmetic logic unit 46 for use by a second subsequent load instruction. The data control data, or general register data specified by the "b" field of the load instruction, is transmitted by multiplexer 48 to the input of arithmetic logic 46 via line 54. An immediate value, known as an expanded IM14 value (E-IM14), is also connected to the input of arithmetic logic unit 46 via line 56. Arithmetic logic unit 46 adds the immediate value (E-IM14) with either the data cache (DCD) or the general register data as specified by the "b" field of the load instruction [GR(b)] to produce a "data cache address" on line 58. The data cache address is directed, via line 58, to data cache 14 to fetch data stored in the data cache at the data cache address.

Figure 2:
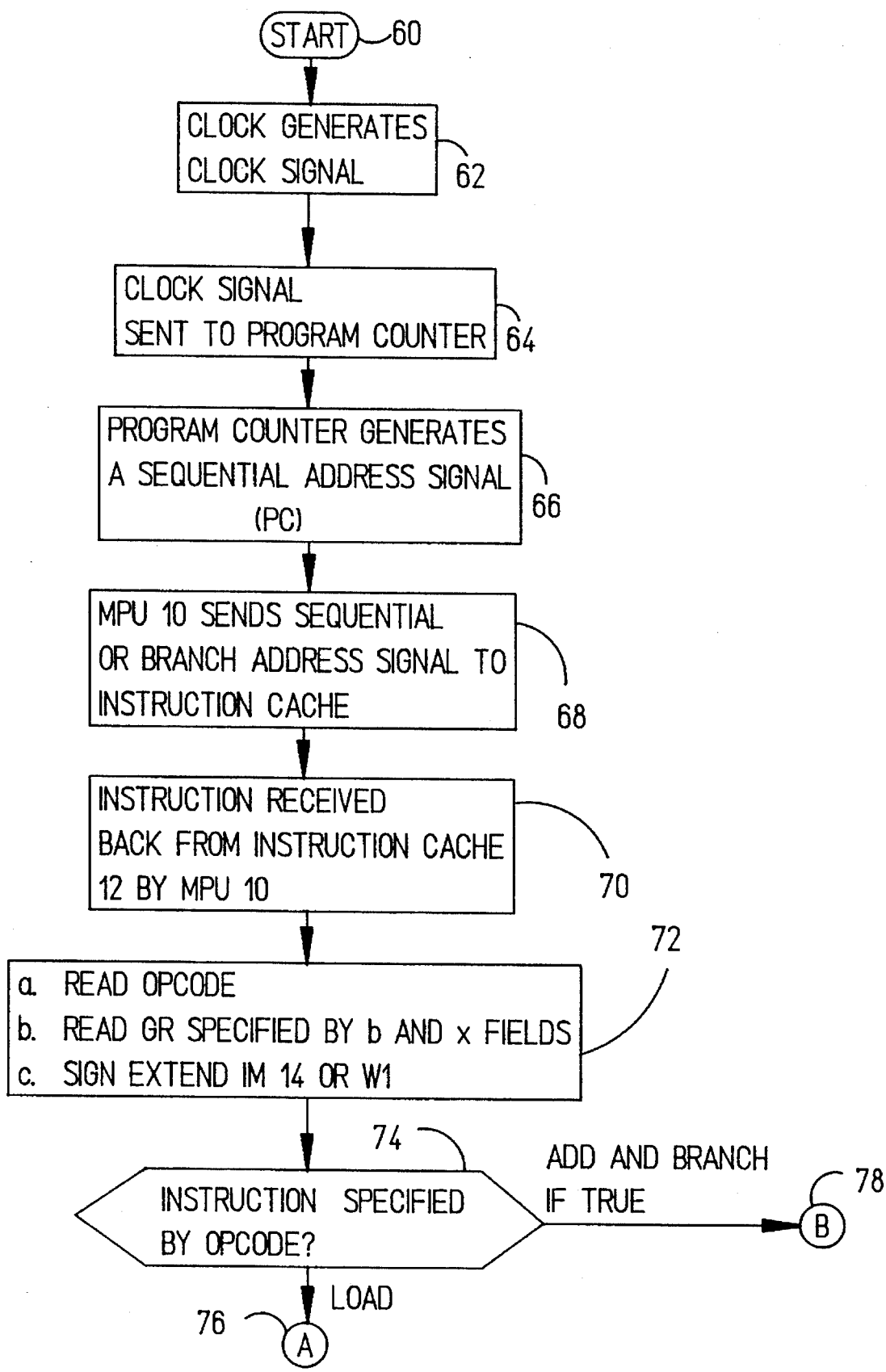
FIG. 2 is a flow diagram of the operation of the device illustrated in FIG. 1 in accordance with the present invention.

FIG. 2 is a flow diagram illustrating the operation of the device of FIG. 1. As shown in FIG. 2, the process starts, as illustrated by reference numeral 60, and the clocks generate clock signals, as illustrated by reference numeral 62. The clock signal is then sent to the program counter, at reference numeral 64, and the program counter generates a sequential address signal (PC), as illustrated by reference numeral 66. The microprocessor unit 10 then sends a sequential PC or branch address signal to the instruction cache 12, as illustrated by reference numeral 68, and the instruction is received back from the instruction cache 12 by the microprocessor unit 10, as illustrated by reference numeral 70. Reference numeral 72 illustrates the functions performed by control unit 20 once the instruction is received from the instruction cache 12. Control unit 20 simultaneously reads the operational code (opcode) of the instruction which is further described in FIGS. 7 and 8. Control unit 20 also simultaneously generates a read signal on lines 42 and 44 to read the general register 40 at the locations specified by the "b" and "x" fields of the instruction, which is also further described in FIGS. 7 and 8. Additionally, control unit 20 simultaneously produces the sign extended value specified by a current branch instruction (E-W1), or a sign extended immediate value (E-IM14), depending on whether the instruction is a branch instruction or a load instruction, respectively. The immediate value (E-IM14) and the value specified by the current branch instruction (E-W1) are values that are derived from the instructions as further described in FIGS. 7 and 8. Control unit 20 performs a sign extend operation on W1 and IM14 which comprises the process of repeating the positive or negative sign of these values up to a certain number of bits, e.g. 32 bits. Reference numeral 74 illustrates a decision block to determine if the instruction specified by the operational code is a load instruction, as illustrated by reference numeral 76, as more more fully described in FIG. 3, or an add and branch if true instruction, illustrated by reference numeral 78, as more fully illustrated in FIG. 4.

FIG. 3 is a flow diagram illustrating the operation and device of FIG. 1 in response to a load instruction. As illustrated by decision block 80, control unit 20 compares the target address specified by the t field of a current instruction with the operand address specified by the b field of a second subsequent instruction to determine if they are the same or different. If these addresses are the same, control unit 20 generates a bypass control signal on line 52 which is directed to multiplexer 48 to select the data cache data (DCD) to be transmitted to the arithmetic logic unit 46 via line 54. In this manner, data cache data (DCD) from a current instruction step is available at the input of arithmetic logic unit 46 to be combined with an immediate value (E-IM14) for a current instruction step whenever the current instruction step target address "t" is the same as the operand address "b" of the second subsequent instruction. This process of directing the data cache data directly to the input of the arithmetic logic unit allows the data cache 14 to have a response time of one and a half cycles, without delaying the use of the data cache data in a second subsequent instruction step.

If a bypass procedure were not implemented in accordance with the present invention, the data cache data would otherwise have to be written to the general registers, and then subsequently read from the general registers. In such a case, the data would not be available in time for a second subsequent load instruction and additional instruction step delay would be imposed in the system.

Hence, the generation of the bypass control signal allows the data cache 14 to have a 1.5 cycle response time without delaying the use of the data with a second subsequent instruction, whenever the target address of a current instruction is the same as the operand address of a second subsequent instruction. Reference numeral 82 illustrates a selection of the bypass data by directing data from the data cache, for a current instruction, directly to arithmetic logic unit 46.

If it is determined that the target address of a current load instruction is not the same as the operand address of a second subsequent load instruction, reference numeral 84 of FIG. 3 illustrates that control unit 20 produces a signal on line 42 to read the contents of the general register at the address specified by "b" field of the load instruction. This data [GR(b)data] on line 54, or the data cache data (DC data), is then directed to the input of the arithmetic logic unit 46. Arithmetic logic unit 46 then adds the GR(b) data, or the data cache data, with the immediate value data of a second subsequent load instruction (E-IM14) in the ALU 46 to generate a data cache address on line 58, as illustrated by reference numeral 86 in FIG. 3. The data cache address is then issued from microprocessor 10 to data cache 14, as illustrated by reference numeral 88 and the data is received back from the data cache 14, via line 50, as illustrated by reference numeral 90 of FIG. 3. Data is then written to the general register 40 at the target address specified by the "t" field of the load instruction, as illustrated by reference numeral 92. Data cache store control signal 41 controls the writing of the data cache data (DCD) to the general register 40. As illustrated by reference numeral 94 of FIG. 3, the data cache is also directed to multiplexer 48 to be available whenever the bypass control signal is generated.

Figure 4:
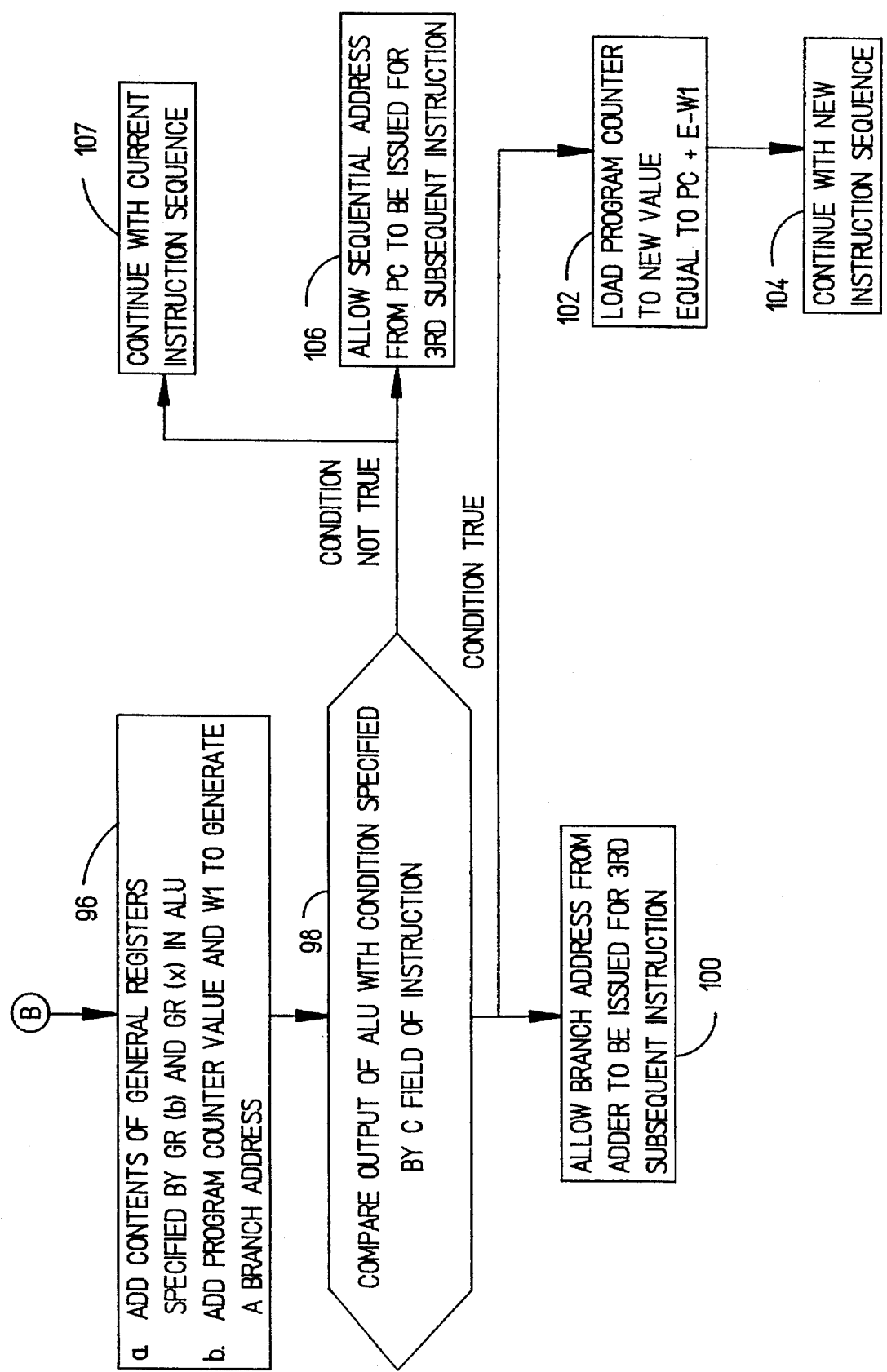
FIG. 4 is a flow diagram of the operation of the device of FIG. 1 during an add and branch if true instruction step.

FIG. 4 illustrates the operation of the device of FIG. 1 when an add and branch if true instruction is received from instruction cache 12. As illustrated in FIG. 4, reference numeral 96 indicates that read signals are generated on lines 42 and 44 to read the general register data specified at the "b" field [GR(b)data] and the "x" field [GR(x)data] from the general register 40. The GR(x) data and either the data cache data or GR(b) data, via multiplexer 48, are directed to ALU46 and added to produce a general register sum at output 38. Simultaneously, the program counter value (PC) and the sign extended W1 value (E-W1), read from the branch instruction, are added by branch adder 24, to generate a branch address which is applied to multiplexer 26. As illustrated by reference numeral 98 of FIG. 4, comparator 36 compares the general register sum 38 with a condition value (C) that is specified by the "c" field of the add and branch if true instruction, and directed to comparator 36 via line 40 from control unit 20. If the condition value 40 matches the general register sum 38, a comparator control signal 34 is produced which is applied to multiplexer 26 to cause the branch address to be applied to instruction cache 12, which is equal to the program counter value (PC) plus the sign extended W1 value (PC+E-W1). This is illustrated by reference numeral 100 of FIG. 4 which allows the branch address (PC+E-W) from branch adder 24 to be fetched for a third subsequent instruction. In other words, even though the instruction cache access time is 1.5 cycles, the branch address (PC+E-W1) is still available in time for the instruction cache 12 to produce an instruction for a third subsequent instruction. This is more fully disclosed in the description of FIG. 6. As indicated by reference numeral 102, program counter 22 is loaded with a new program value equal to the program counter value plus the sign extended W1 value (PC+E-W1), via line 32. Program counter 22 then continues with the new value for the instruction sequence as illustrated by reference numeral 104. As indicated by reference numeral 106, if the condition value is not the same as the general register sum, a comparator control 34 is not produced. In this case, the PC value is selected by multiplexer 26 to allow the sequential address from the PC to be issued for a third subsequent instruction as indicated by reference numeral 107.

Figure 5:
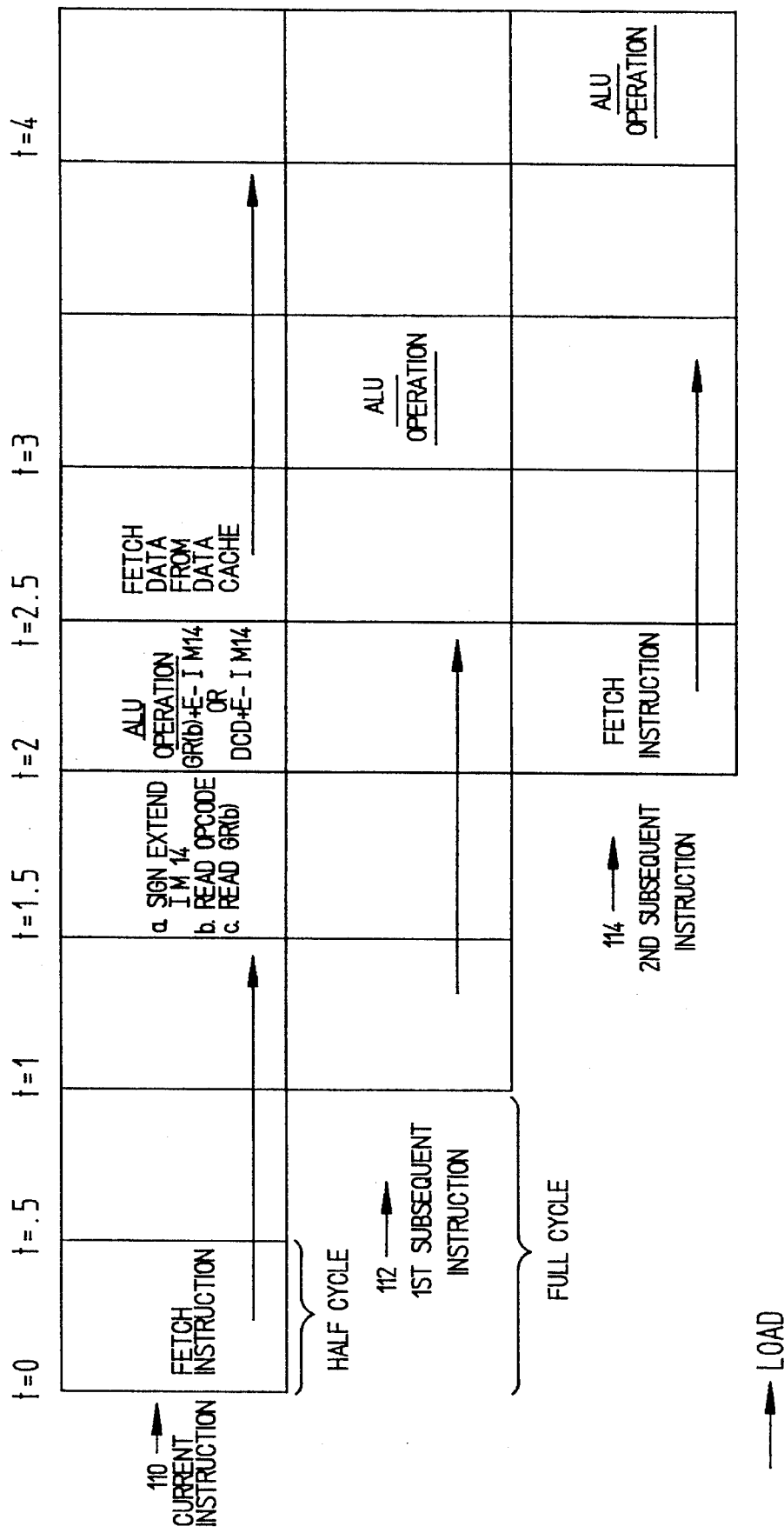
FIG. 5 is a schematic diagram of the pipeline of the present invention during execution of load instructions.

FIG. 5 is a schematic diagram illustrating the pipeline for a series of load instructions. As illustrated in FIG. 5, a series of sequential load instructions 110, 112, 114 are issued. The first instruction illustrated is the current load instruction 110 which can comprise an instruction which falls anywhere within the pipeline, i.e., a series of previous instructions may have preceded these instructions. The next instruction, i.e., first subsequent instruction 112, is also illustrated as a load instruction. Although FIG. 5 illustrates a series of successive load instruction steps, first subsequent instruction step 112 need not necessarily be a load instruction to comprise a series of successive load instruction steps. Second subsequent load instruction 114 is also illustrated in the same manner in FIG. 5.

FIG. 5 illustrates, in graphic form, the manner in which each of the instruction steps proceeds in time. At the times T=0, T=1, T=2, and each integer number thereafter, clock 16 produces a cycle clock pulse to indicate the beginning of each cycle. A full cycle occurs between T=0 and T=1, and between each of the integer numbers shown. Clock 18 produces clock pulses at T=0.5, T=1.5, and so on, to designate half cycle times between the cycle clock pulses produced by clock 16. In other words, clock 18 produces a series a clock pulses that are phase shifted by 180 degrees, or half a cycle from the cycle clock pulses produced by clock 16.

Referring again to FIG. 5, the current load instruction 110 illustrates the manner in which instruction cache 12 is allowed 1.5 cycles, between time T=0 and time T=1.5, to fetch an instruction. During the next half instruction step, the device of FIG. 1 performs a sign extension operation on the immediate value IM14, reads the operational code (opcode), and reads the general register specified by the "b" field. Between time T=2 and time T=2.5, the ALU 46 performs its operation by adding either the GR(b) data and the E-IM14 data, or the data cache data (DCD) and the E-IM14 data, to produce the data cache address on line 58 (FIG. 1). Data cache 14 is then given one and a half cycles between time T=2.5 and time T=4 to fetch data from the data cache and return it to the microprocessor chip. If the target address of the current instruction is the same as the operand address of the second subsequent instruction 14, a bypass control signal is generated by control unit 20 to direct the data from the data cache of the current instruction 110 directly to ALU46 so that the data cache data (DCD) is available for use by the second subsequent instruction 114. In this manner, FIG. 5 illustrates the way in which both the instruction cache and the data cache can be allowed a 1.5 cycle access time without imposing a delay penalty of more than a one instruction step delay. In other words, only the first subsequent instruction 112 must be delayed by one instruction step if its operand address is the same as the target address for the current instruction step 110.

FIG. 5 illustrates the manner in which the data is made available from the current instruction step 110 for the ALU operation of the second subsequent instruction step 114. In this manner, both the instruction cache access time and the data cache access time can be 1.5 cycles without imposing any greater delays than the delays that would normally be inherent in a one cycle access time, i.e., a one step delay. If the data cache access time were extended to two cycles it is clear that the data from the current instruction step 110 would not be available for the ALU operation of the second subsequent instruction 114 and an additional instruction step delay would be imposed on the pipeline.

Figure 6:
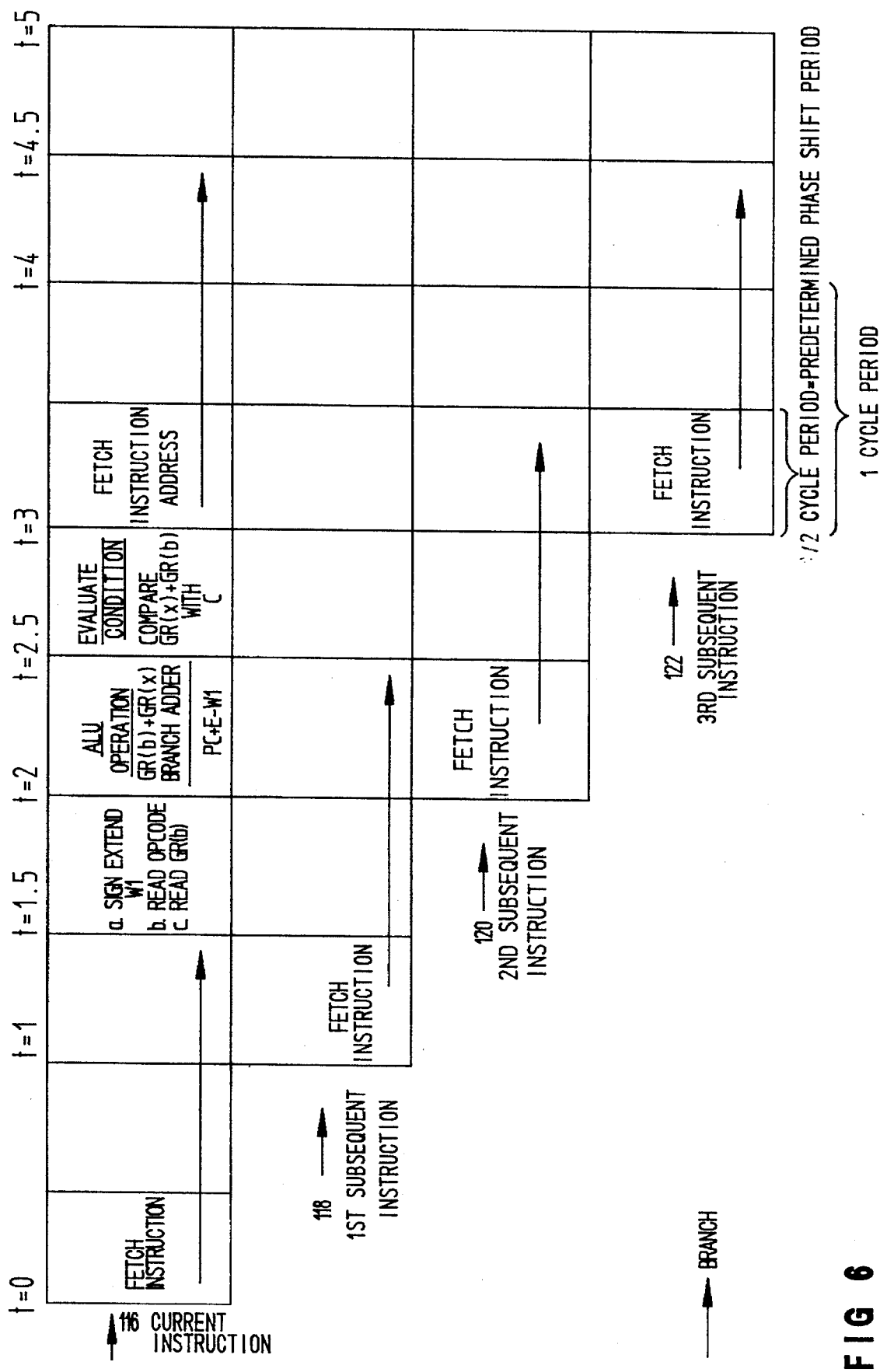
FIG. 6 is a schematic diagram of the pipeline of the present invention during execution of branch instructions.

FIG. 6 schematically illustrates the instruction pipeline of the present invention for branch instructions. The clock signals are generated in the same manner as set forth in the description of FIG. 5 to produce half cycle periods equal to the predetermined phase shift period and full cycle periods. As illustrated in FIG. 6, the instruction cache for current instruction 116 is allowed 1.5 cycles between T=0 and T=1.5 to fetch an instruction. During the next half cycle, between T=1.5 and T=2, the device of FIG. 1 sign extends W1, reads the opcode of the branch instruction, and reads the general registers specified by the "b" field. During the next half cycle between T=2 and T=2.5, the ALU performs an operation of adding the GR(b) data and the GR(x) data, and the branch adder adds the program counter (PC) data with the sign extended W1 data (E-W1). During the next half cycle, between T=2.5 and T=3, comparator 36 compares the general register sum GR(x)+GR(b) with the condition value "c" to determine if a branch instruction should be issued. The multiplexer 26 selects either the PC value or the PC value and the extended W1 value based upon the comparison to generate an address of the instruction cache. The address is then available for the next instruction fetch during the time between T=3 and T=4.5. The instruction cache is then given a 1.5 cycle access time between T=3 and T=4.5 to retrieve the instruction, stored at the address whether it be the next subsequent instruction, or a branch instruction.

As illustrated in FIG. 6, the third subsequent instruction 122 also fetches its initial instruction between T=3 and T=4.5, which exactly matches the time during which the current instruction 116 generates the next instruction address. Consequently, the instruction cache address generated from current instruction 116 is available for the third subsequent instruction 122 even though the instruction cache has been allowed a 1.5 cycle access time. In a one state delay branch architecture, the first subsequent instruction 118 is executed so it is not considered as a delay. In other words, a branch instruction is positioned within the sequence of instructions so that the first subsequent instruction 118 can normally be executed. Hence, the only instruction step that must be necessarily delayed is the second subsequent instruction 120, resulting in a one instruction step delay for a one state delay branch architecture.

FIG. 7 illustrates the data field of a 32-bit branch instruction utilized in accordance with the present invention. As shown in FIG. 7, the first six bits of the 32-bit branch instruction is an operational code (opcode) which indicates that the instruction is indeed an add and branch if true instruction. The next five bits comprise the "b" field, which specifies a field within the general register to retrieve data. The next five bits comprise the "x" field which also specifies an address within the general registers to retrieve data. As illustrated in FIG. 1, the GR(b) and GR(x) data retrieved from the general register 40 are added together to form the general register sum. Referring again to FIG. 7, the next three bits comprise the "c" field, which constitute a three bit condition value which is compared to the general register sum to determine if a specified condition, i.e., the condition value, is true. The next 11 bits of the branch instruction comprise a value specified by the branch instruction, which is referred to as the W1 field. The subsequent two bits comprise control bits such as a nullify bit.

FIG. 8 illustrates the data field of a 32-bit load instruction utilized in accordance with the present invention. As illustrated in FIG. 8, the first six bits of the load instruction are also an operation code (opcode) identifying the instruction as a load instruction. Similarly, the next five bits also specify the "b" field, which comprises the "operand address" of the load instruction, i.e., the address from which data is to be retrieved from the general register. The next five bits comprise the "t" field or target field. The "t" field comprises the "target address" at which the data cache data (DCD) is to be stored in the general registers. The next two bits are space bits, and the remaining 14 bits comprise the immediate value (IM14) which is expanded and then combined in the arithmetic logic unit 46 with data cache data (DCD) or the GR(b) data, as illustrated in FIG. 1.

Hence the preset invention comprises a device and method for allowing cache memory to operate, or have an access time, of greater than one cycle, but less than two cycles, without imposing any penalties for instruction step delays. The overall effect is that microprocessors can run at a much greater speed than would otherwise be allowed by the limitations resulting from the access time for cache memory. Additionally, the generation of phase delay clock pulses allows a function to be performed in partial cycles which further increases the speed of the microprocessor.

The foregoing description of the invention has been presented for purposes of illustration. It is not intended to be exhaustive or to limit the precise form disclosed, and other modifications and variations may be possible in light of the above teachings. For example, the present invention may be implemented by allowing a three cycle access time for cache memory and initiating instructions every two cycles. Such a variation is considered to be an equivalent of the claimed invention and within the scope of the claims as set forth herein. The embodiment was chosen and described in order to best explain the principles of the invention and its practical application to thereby enable others skilled in the art to best utilize the invention and various modifications as are suited to the particular use contemplated. It is intended that the appended claims be construed to include other alternative embodiments of the invention except insofar as limited by the prior art.

What is claimed is:

1. An instruction pipeline for executing successive instructions in a computer system, said instruction pipeline having a predetermined cycle rate associated therewith whereby the execution of each successive instruction is initiated during corresponding successive cycle intervals, comprising:

a general register comprising a plurality of register fields, each register field having a unique address associated therewith;

a control unit for receiving each successive instruction and for initiating a processing of each successive instruction at one cycle intervals, at least some of said instructions being load instructions having an operand address that specifies a general register field from which data is to be read, an immediate address, and a target address that specifies a general register field to which data is to be written;

an arithmetic logic unit (ALU) for determining a data cache address;

a data cache memory for receiving a data cache address and providing data cache data to the general register in response to said data cache address, a minimum access time capability of said data cache memory being greater than one cycle interval; and by-pass circuitry for by-passing the general register and providing data cache data directly to the ALU in response to a by-pass signal received from the control unit, said control unit being operative to initiate, for a current load instruction, the following processing steps:

(a) obtaining, during a first half-cycle period, the data stored in the register field specified by the operand address of the current load instruction;

(b) generating in the ALU, during a second half-cycle period, a data cache address based upon the data obtained in step (a) and the immediate address of the current load instruction, and providing data cache address to the data cache;

(c) performing the following additional steps during a next one and one-half cycles while waiting for the data cache to access the data cache data residing at the data cache address:

(i) comparing the target address of the current load instruction to the operand address of a first subsequent load instruction; and (ii) if the target address of the current load instruction is equal to the operand address of the first subsequent load instruction, then imposing a one instruction step delay on the first subsequent load instruction, said delayed first subsequent instruction thereby defining a second subsequent instruction, and generating a by-pass signal so that during a next half-cycle period the data cache data is available to the ALU for performing step (b) for the second subsequent instruction, whereby the pipeline provides an access time of one and one-half cycles to the data cache but does not impose greater than a one instruction step delay when the target address of a current load instruction is equal to the operand address of a first subsequent load instruction.

2. The instruction pipeline recited in claim 1, wherein said general register accesses data in said register fields within a one-half cycle period, said ALU generates a data cache address within a one-half cycle period, and said data cache memory fetches said data cache data within a one and one-half cycle period.

3. The instruction pipeline recited in claim 1 further comprising:

a first clock for generating a series of cycle clock pulses, the period between each successive cycle clock pulse defining a one cycle period; and a second clock for generating a series of phase shifted clock pulses that are phase shifted one-half cycle from said cycle clock pulses, the period between each cycle clock pulse and a subsequent phase shifted clock pulse defining a one half-cycle period.

4. The instruction pipeline recited in claim 1 wherein at least others of the instructions are branch instructions each comprising a first operand address specifying a first register field from which data is to be read, a second operand address specifying a second register field from which data is to be read, a condition value and a program counter offset (W1), and wherein said instruction pipeline further comprises a one state delay branch architecture comprising at least:

an instruction cache memory for storing said instructions and for fetching instructions therefrom and having a minimum access time capability that is greater than said cycle interval;

a program counter for incrementing a count at the beginning of successive one cycle periods; and a branch adder for generating a branch address, said control unit being operative to perform the following steps for a current branch instruction:

(a) obtaining, during a first half-cycle period, the data stored in each of the two register fields specified by the first and second operand addresses of the current branch instruction;

(b) during a next half-cycle period, generating, in the ALU, a general register sum based upon the data obtained in step (a), and generating, in the branch adder, a branch address based upon the program counter offset (W1) of the branch instruction and the program counter count;

(c) comparing, during a next half-cycle period, the condition value of the branch instruction to the general register sum and if the condition value is equal to the general register sum, providing the branch address to the instruction cache memory, but otherwise providing the program counter count as an address to the instruction cache memory; and (d) waiting one and one-half cycles for the instruction cache memory to fetch the instruction residing at the address provided thereto in step (c), said fetched instruction being available for processing as a third subsequent instruction.

5. The instruction pipeline recited in claim 4 wherein an instruction stored in said instruction cache memory is fetched within a one and one-half cycle period.

6. In a pipelined computer system having a predetermined cycle rate in which the execution of successive instructions are initiated during corresponding successive cycle intervals comprising a general register having a plurality of uniquely addressable register fields, an arithmetic logic unit (ALU) for determining a data cache address, and a data cache memory for receiving a data cache address and providing data cache data to the general register in response to said data cache address, said data cache memory having a minimum access time capability that is greater than one cycle interval, a method for executing successive load instructions, wherein each load instruction comprises an operand address that specifies a general register field from which data is to be read, an immediate address, and a target address that specifies a general register field to which data is to be written, said method comprising the steps of:

(a) obtaining, during a first half-cycle period, the data stored in the register field specified by the operand address of a current load instruction;

(b) generating in the ALU, during a second half-cycle period, a data cache address based upon the data obtained in step (a) and the immediate address of the current load instruction, and providing the data cache address to the data cache; and (c) performing the following additional steps during a next one and one-half cycles while waiting for the data cache to fetch the data cache data residing at the data cache address:

(i) comparing the target address of the current load instruction to the operand address of a first subsequent load instruction; and (ii) if the target address of the current load instruction is identical to the operand address of the first subsequent load instruction, then imposing a one instruction step delay on the first subsequent load instruction, said delayed first subsequent load instruction thereby defining a second subsequent instruction, and by-passing the general register and providing the fetched data cache data directly to the ALU so that during a next half-cycle period the data cache data is available for performing step (b) for the second subsequent load instruction, whereby a maximum delay penalty of one instruction step delay is imposed when the target address of a current load instruction is identical to the operand address of a first subsequent load instruction.

7. An instruction pipeline for executing successive instructions during successive cycle periods wherein, for each cycle period, execution of a different one of said instructions is initiated, said pipeline comprising:

general register means having a plurality of register fields for storing data, each register field having a unique address associated therewith;

arithmetic logic unit means (ALU) for generating a data cache address based at least in-part upon data stored in one of said register fields in a period of less than one half cycle;

data cache means having a minimum access time capability that is greater than one cycle period and for providing data cache data to the general register in response to a data cache address; and control means having a rate of operation that is faster than the cycle rate, said control means being interfaced with the general register means and the ALU means for controlling the execution of each instruction, said control means being operative to allocate to said data cache means more than one cycle but less than two cycles in which to provide data cache data in response to a data cache address, and being further operative during execution of a current instruction to by-pass the general register means and provide the data cache data directly to the ALU whenever the data cache data is required by the ALU for execution of a second subsequent instruction thereby avoiding the imposition of greater than a one instruction step delay.

8. An instruction pipeline according to claim 7 further comprising:

first clock means for generating a series of cycle clock pulses, the period between each successive cycle clock pulse defining one cycle; and second clock means for generating a series of phase shifted clock pulses that are phase shifted one-half cycle from said cycle clock pulses, the period between each cycle clock pulse and a subsequent phase shifted clock pulse defining one half-cycle.

9. An instruction pipeline according to claim 8 wherein the control means allocates approximately one and one-half (1.5) cycles to the data cache.

10. An instruction pipeline according to claim 7 wherein at least some of said instructions are load instructions having an operand address that specifies a general register field from which data is to be read, a target address that specifies a general register field to which data is to be written, and an immediate address, and wherein said control means is operative to by-pass the general register means whenever the target address of a current load instruction is identical to the operand address of a second subsequent instruction.

11. An instruction pipeline according to claim 10 wherein during execution of a load instruction the ALU determines a data cache address based upon the immediate address of the load instruction and the data stored in a register field specified by the operand address of the load instruction.

12. An instruction pipeline according to claim 7, wherein said instruction pipeline has a one state delay branch architecture and further comprises:

program counter means for generating a sequential instruction address for each cycle period;

branch adder means for generating a branch address during execution of branch instruction; and an instruction cache containing instructions to be executed by the pipeline, the instruction cache being operative to fetch an instruction in response to one of either a sequential instruction address or a branch address and having a minimum access time capability that is greater than one cycle period, said control means being further operative to allocate to the instruction cache more than one cycle but less than two cycles in which to fetch an instruction in response to an address provided thereto, and being still further operative during execution of a current branch instruction to provide a branch address to said instruction cache when a condition specified by the current branch instruction is satisfied, the instruction fetched in response to the branch address being available for execution as a third subsequent instruction.

13. An instruction pipeline for executing successive instructions during successive cycle periods wherein, for each cycle period, execution of a different one of said instructions is initiated, said pipeline implementing a one state delay branch architecture comprising:

program counter means for generating a sequential instruction address for each cycle period;

branch adder means for generating a branch address during execution of a branch instruction;

an instruction cache having a minimum access time capability that is greater than one cycle period and containing instructions to be executed by the pipeline, said instruction cache being operative to fetch an instruction in response to one of either a sequential instruction address or a branch address;

control means for controlling the execution of each instruction, said control means being operative to allocate to the instruction cache more than one cycle but less than two cycles in which to fetch an instruction in response to an address provided thereto, and being further operative during execution of a current branch instruction to provide a branch address to said instruction cache when a condition specified by the current branch instruction is satisfied;

means for ensuring that an instruction fetched in response to the branch address is available for execution as a third subsequent instruction;

general register means having a plurality of register fields for storing data, each register field having a unique address associated therewith, at least some of said instructions being load instructions having an operand address that specifies a general register field from which data is to be read and a target address that specifies a general register field to which data is to be written;

arithmetic logic unit means (ALU) for determining a data cache address based at least in-part upon data stored in one of said register fields; and data cache means having a minimum access time capability that is greater than one cycle period and for providing data cache data to the general register means in response to a data cache address, said control means being further operative to allocate to said data cache means more than one cycle but less than two cycles in which to provide data cache data in response to a data cache address, and being still further operative during execution of a current load instruction to by-pass the general register means and provide data cache data directly to the ALU whenever the target address of the current load instruction is identical to the operand address of a second subsequent load instruction, thereby avoiding the imposition of any additional instruction step delays.

14. An instruction pipeline according to claim 13 further comprising:

first clock means for generating a series of cycle clock pulses, the period between each successive cycle clock pulse defining one cycle; and second clock means for generating a series of phase shifted clock pulses that are phase shifted one-half cycle from said cycle clock pulses, the period between each cycle clock pulse and a subsequent phase shifted clock pulse defining one half-cycle.

15. An instruction pipeline according to claim 14 wherein the control means allocates approximately one and one-half (1.5) cycles to the instruction cache.

16. A method of executing a series of successive instructions in a pipelined computer system wherein a current instruction is followed by subsequent instructions and wherein a separate instruction step is initiated for at least every cycle comprising the steps of:

(a) allocating to a data cache in said computer system at least an amount of time equal to the minimum access time capability of the data cache but less than two cycles in which to provide data cache data in response to a data cache address, wherein the minimum access time capability of said data cache is more than one cycle;

(b) imposing a one instruction step delay on a first subsequent instruction when data cache data provided by said data cache during execution of a current instruction is required by an ALU for execution of the first subsequent instruction, said first subsequent instruction thereby becoming a second subsequent instruction; and then (c) directing said data cache data directly to the ALU, said data cache data thereby being available for execution of said second subsequent instruction.

17. A method according to claim 16 wherein the current instruction and first subsequent instruction are load instructions each comprising an operand address and a target address, and wherein steps (b) and (c) are performed only when the target address of the current load instruction is identical to the operand address of the first subsequent load instruction.

18. A method of executing a series of successive instructions in a pipelined computer system where a current instruction is followed by subsequent instructions and wherein a separate instruction step is initiated for at least every cycle, said pipelined computer system employing an instruction cache and a data cache each having a minimum access time capability that is greater than one cycle, comprising the steps of:

fetching instructions from said instruction cache in less than two cycles and more than one cycle to allow an access time of more than one cycle for said instruction cache;

fetching data from said data cache in less than two cycles and more than one cycle to allow an access time of more than one cycle for said data cache;

directing data fetched from said data cache to an arithmetic logic unit whenever said data is required by a second subsequent load instruction step, said fetched data thereby being available for said second subsequent load instruction step; and, fetching an instruction in response to a third subsequent instruction step from an instruction address specified by a current branch instruction step whenever a specified condition in said current instruction step is true, and ensuring that said fetched instruction is available for said third subsequent instruction step so as to avoid imposing a delay penalty of more than one instruction step delay.

19. The method of claim 18 wherein said step of accessing an instruction cache further comprises accessing said instruction cache in approximately 1.5 cycles.

20. The method of claim 18 wherein said step of accessing a data cache further comprises accessing said data cache in approximately 1.5 cycles.

21. A method of executing a series of successive load instruction steps in a pipelined computer system wherein a current instruction is followed by subsequent instructions and wherein the computer system produces a clock pulse that is phase shifted from a cycle clock pulse by a predetermined phase shift period, comprising the steps of:

accessing a data cache in said computer system to fetch data cache data during an access time period substantially equal to one cycle plus said predetermined phase shift period, said data cache having a minimum access time capability that is greater than the interval between cycle clock pulses;

comparing a target address of a current load instruction with an operand address of a first subsequent load instruction;

directing said fetched data cache data to an arithmetic logic unit whenever said operand address is identical to said target address, said fetched data cache data thereby being available for said first subsequent load instruction without imposing a delay penalty of more than a one instruction step delay.

22. The method of claim 21, further comprising the step of:

accessing an instruction cache in said computer system to fetch an instruction during an access time period substantially equal to one cycle plus said predetermined phase shift period, said instruction cache having a minimum access time capability that is greater than the interval between cycle clock pulses.

23. The method of claim 22 wherein said predetermined phase shift period is substantially equal to 0.5 cycles.

24. A method of executing instructions in an instruction pipeline that allows more than one cycle access time for an instruction cache and a data cache while imposing a delay of only one instruction step for load instructions and branch instructions in a one state delay branch architecture and wherein current load, and current branch, instructions are followed by subsequent load, and subsequent branch instructions, respectively, comprising the steps of:

generating two clock signals that have substantially equal periods that are equal to one cycle in said instruction pipeline;

phase delaying one of said two clock signals by a predetermined phase delay period;

sequencing a program counter with said clock signals to generate a sequential instruction address for each cycle;

fetching a current instruction from said instruction cache at said sequential instruction address during a period equal to one cycle plus said predetermined phase delay period, said instruction cache having a minimum access time capability that is greater than one cycle;

reading an operational code of said current instruction to determine the type of instruction to be performed;

wherein, for load instructions, the following steps are performed:

comparing a target address of a current load instruction step with an operand address of a second subsequent load instruction step;

directing said data cache data from a data cache having a minimum access time capability that is greater than one cycle to an arithmetic logic unit whenever said target address of said current load instruction step is identical to said operand address of said second subsequent load instruction step thereby avoiding a delay penalty that is greater than one instruction step delay;

reading general register data from a general register specified by said operand address of said second subsequent load instruction step whenever said operand address of said second subsequent load instruction step is different than said target address of said current load instruction step;

separately adding said general register data or said data cache data to an immediate value of said current load instruction to generate a data cache address;

fetching data from said data cache at said data cache address during a period equal to one cycle plus said predetermined phase delay period;

storing said fetched data cache data at said target address of said current load instruction step in said general register;

and wherein, for branch instructions, the following steps are performed:

adding the contents of two general registers specified by a current branch instruction to produce a general register sum;

adding said sequential instruction address to a value specified by said current branch instruction to produce a branch address;

comparing said general register sum with a condition value specified by said current branch instruction;

issuing said sequential instruction address whenever said general register sum is different from said condition value;

issuing said branch address whenever said general register sum is identical to said condition value, and ensuring that said branch address is available for a third subsequent instruction step that has been delayed by at most one instruction step;

fetching an instruction from said branch address for said third subsequent instruction step; and, resetting said program counter to said branch address.

25. The method of claim 24 wherein said phase delay period is substantially equal to 0.5 cycles.

26. A method of executing load instructions in an instruction pipeline that allows more than a one cycle access time for a data cache while imposing a maximum delay of only one instruction step for load instructions, comprising the steps of:

producing a series of cycle clock pulses to define a cycle period said data cache having a minimum access time capability that is more than said cycle period;

producing a series of phase shifted clock pulses that are phase shifted from said cycle clock pulses by a predetermined phase shift period;

comparing a target address of a current load instruction step with an operand address of a second subsequent load instruction step, said second subsequent instruction step corresponding to one of a first subsequent instruction delayed by one instruction step and a second subsequent instruction;

directing data cache data from the data cache to an arithmetic logic unit whenever said target address of said current load instruction step is identical to said operand address of said second subsequent load instruction step thereby imposing a delay of no greater than one instruction step;

reading general register data from a general register during said second subsequent load instruction step whenever said operand address of said second subsequent load instruction step is different than said target address of said current load instruction step;

adding said general register data to an immediate value of said current load instruction step to generate a data cache address whenever said operand address of said second subsequent load instruction step is different than said target address of said current load instruction step;

adding said data cache data to said immediate value to generate said data cache address whenever said target address is identical to said operand address;

fetching data cache data stored in said data cache at said data cache address during a period equal to one cycle plus said predetermined phase shift period; and storing fetched data cache data at said target address of said current load instruction step in said general register.

27. A method of executing branch instructions in an instruction pipeline that allows more than a one cycle access time for an instruction cache while imposing a delay of only one instruction step in a one state delay branch architecture and wherein current branch instructions are followed by subsequent branch instructions, comprising the steps of:

producing a series of cycle clock pulses to define a cycle period, said instruction cache having a minimum access time capability of more than one cycle period;

producing a series of phase shifted clock pulses that are phase shifted from said cycle clock pulses by a predetermined phase shift period;

fetching a current branch instruction from said instruction cache at an address specified by a sequential instruction address during a period substantially equal to one cycle plus said predetermined phase shift period;

adding the contents of two general registers specified by said current branch instruction to produce a general register sum;

adding said sequential instruction address to a value specified by said current branch instruction to produce a branch address;

comparing said general register sum with a condition value specified by said current branch instruction;

issuing said sequential instruction address whenever said general register sum is different from said condition value;

issuing said branch address whenever said general register sum is the same as said condition value, and ensuring that said branch address is available for a third subsequent instruction step.

28. A device for executing load instructions in an instruction pipeline that allows more than a one cycle access time for a data cache while imposing no more than a one instruction step delay for load instructions comprising:

clock means for generating cycle clock pulses that define a cycle period and phase shifted clock pulses that are phase shifted from said cycle clock pulses by a predetermined phase shift period, said data cache having a minimum access time capability of more than one cycle period;

control means for generating a bypass signal whenever a target address of a current load instruction step is the same as an operand address for a second subsequent load instruction step;

data cache means for fetching data catch data within a period of time substantially equal to said cycle period plus said predetermined phase shift period for generating data cache data;

means for directing said data cache data fetched in response to a current load instruction to an arithmetic logic unit in response to said bypass signal so that said data cache data can be combined with an immediate value associated with a second subsequent load instruction step wherein said second subsequent load instruction corresponds to one of a first subsequent instruction that has been delayed one instruction step and a second subsequent instruction.

29. A one state delay branch architecture for executing branch instructions in an instruction pipeline that allows more than a one cycle access time for an instruction cache while imposing a delay of only one instruction step and wherein current branch instructions are followed by subsequent branch instructions, comprising;

clock means for generating cycle clock pulses that define a predetermined cycle period and phase shifted clock pulses that are phase shifted from said cycle clock pulses by a predetermined phase shift period, said instruction cache having a minimum access time capability that is more than one cycle period;

comparator means for comparing a condition value of a current branch instruction with a general register sum to produce a comparator control signal;

means for generating a branch address whenever said condition value is the same as said general register sum;

said instruction cache means generating an instruction in response to said branch address during an access time that is substantially equal to said predetermined cycle period plus said predetermined phase shift period; and means for ensuring that said branch instruction is available for use in a third subsequent instruction step to avoid imposing more than one instruction step delay.

* * * * *